(12) United States Patent
Grayson

(10) Patent No.: US 7,085,292 B1
(45) Date of Patent: Aug. 1, 2006

(54) WIRELESS NETWORKED DEVICE INSTALLATION

(75) Inventor: Paul D. Grayson, Ellel (GB)

(73) Assignee: U. S. Philips Corporation, Briarcliff Manor, NY (US)

( * ) Notice: Subject to any disclaimer, the term of this patent is extended or adjusted under 35 U.S.C. 154(b) by 0 days.

(21) Appl. No.: 09/124,426

(22) Filed: Jul. 29, 1998

(30) Foreign Application Priority Data

Jul. 19, 1997 (GB) .......................................... 9715858.8

(51) Int. Cl.
*H04J 3/24* (2006.01)

(52) U.S. Cl. ...................................................... 370/475
(58) Field of Classification Search ................. 370/255, 370/310, 312, 328, 329, 340, 341, 475; 340/825.52; 455/414, 415
See application file for complete search history.

(56) References Cited

U.S. PATENT DOCUMENTS

| | | | | |
|---|---|---|---|---|
| 4,513,415 A | * | 4/1985 | Martinez | ..................... 370/312 |
| 5,247,380 A | * | 9/1993 | Lee et al. | ..................... 359/118 |
| 5,740,160 A | * | 4/1998 | Ikegami et al. | ............. 370/255 |
| 5,909,429 A | * | 6/1999 | Satyanarayar | ................ 370/254 |

FOREIGN PATENT DOCUMENTS

| | | |
|---|---|---|
| EP | 0695058 A2 | 7/1995 |
| EP | 0748078 A2 | 5/1996 |

\* cited by examiner

*Primary Examiner*—Ricky Ngo
(74) *Attorney, Agent, or Firm*—Daniel J. Piotrowski

(57) ABSTRACT

A wireless communications system, together with devices to be clustered to make up such a system. The system operates a one-button initiated installation procedure whereby a device not previously installed will determine whether it is within transmission range of a device cluster in installation mode. If so, the device adopts the cluster address and goes through a routine of selecting a device address unique within the cluster. If there is no existing cluster in installation mode, the device selects a network address different to any other within transmission range, as well as a device address. The same one-button procedure places an installed device in a mode to initiate a new device to a cluster. Through a periodic enrolment procedure, performed by each device in a cluster, all devices are enabled to maintain their own list of required functionalities in other devices and to address them directly, thereby removing any requirement for one of the devices to act as a base station.

11 Claims, 5 Drawing Sheets

| NA | TNA | MT | ONA | MPD | | CRC |
|----|-----|----|----|-----|--|-----|

| Node Address | Feature Flags | Feature Score |
|---|---|---|
| 1 | 1, 2, 5 | 3 |
| 34 | 3 | 0 |
| 36 | 4, 5, 6 | 1 |

US 7,085,292 B1

WIRELESS NETWORKED DEVICE INSTALLATION

BACKGROUND OF THE INVENTION

The present invention relates to networked systems composed of a plurality of devices clustered for the exchange of data and control messages formatted according to predetermined protocols and, in particular, to such systems where inter-device communication is via wireless link. The invention further relates to devices for use in groups or clusters to form such systems.

Networked interconnection of devices has long been known and used, starting from basic systems where different system functions have been provided by separate units, for example hi-fi systems or security systems having detectors, a control panel and one or more alarm sounders. A development has been the so-called home bus systems where a greater variety of products have been linked with a view to providing enhanced overall functionality for example domestic audio/video apparatus coupled with a home security system and the use of telephone. An example of such a home bus system is the domestic digital bus (D2B), the communications protocols for which have been issued as standard IEC 1030 by the International Electrotechnical Commission in Geneva, Switzerland. The D2B system provides a single wire control bus to which all devices are interfaced with messages carried between the various devices of the system in a standardised form of data packet.

Even with a single wire link from device to device, the amount of inter-connection can become unwieldy leading to installation problems for the user, especially where a cluster of devices to be linked is spread across two or three rooms. In order to get around some of these problems, the use of radio frequency or infra-red communications has been proposed to replace the wired links with a central base station receiving messages from one device and forwarding to their destination device. The need for a base station introduces its own problems, not the least of which is the fact that each message must be transmitted twice, namely from its source to the base station and from the base station to its target trasmitting each message twice this not only increases the volume of traffic but also increases the risk of transmission errors. In terms of consumer systems, the user is constrained to buy the base station first and, being the most complex part of the system, it will generally be the most expensive. There is also the problem common to all such centralized systems, namely that if the base station fails, the whole system becomes unusable.

While infra-red communication has some problems in terms of line-of-sight constraints leading to limitation on the relative positions of the devices to be interconnected, radio frequency communications can pass through walls, doors and ceilings, which makes their use particularly attractive where clusters spread over two or more rooms. This improved range leads to its own problems, such as RF signals spreading into neighbouring properties where there may be compatible systems operating on the same frequency and according to the same set of communications protocols. This can lead to inter-system interference and control problems.

In order to get around the problem of interference to allow users to operate overlapping clusters, it is necessary to provide all devices within range of the RF transmissions with a unique identifier (device address) so that devices can ignore messages carrying identifiers other than their own.

Various techniques for unique device address generation have been proposed, including providing sets of switches so that a user can set different codes for each device they own. Such a set up procedure is cumbersome for the user and still leaves a need for the user to consult with their neighbours over address selection in order to avoid duplication. Systems using random number selectors are a great improvement in terms of simplifying the set up procedure for the user. However, these systems have a slight drawback in that they rely on the probability that the number they select will be locally unique. The probability that the selected number will be locally unique will, of course, drop as the number of devices in the locality increases. The probability of unique selection can be increased by lengthening the number of digits in the random number but this has its own penalty in terms of increased system complexity, both in the generation and handling of longer device addresses, and a locally unique number may still not be selected.

SUMMARY OF THE INVENTION

It is therefore an object of the present invention to provide a wireless communications system providing an installation operation with a reduced likelihood of duplicate device address generation.

It is a further object of the present invention to provide such a wireless communication system not requiring any of the clustered devices to be configured as a base station.

It is a still further object of the present invention to provide such a wireless communications system that is very simple for a user to install and to add to.

In accordance with the present invention there is provided a device for use as a station in a wireless communications system comprised of a cluster of such devices operating according to a predetermined communications protocol, the device comprising control means coupled with an address data store and a transceiver, the control means being operable to transmit and receive data and control messages via said transceiver and to effect an installation procedure whereby each device of a cluster obtains a different device address;

wherein the control means is arranged, on receipt of a command to effect an installation procedure:

a) to generate and broadcast a first message requesting a network address, to store a network address if received in reply, else to generate a network address;

b) if a network address is received at step a) to generate a device address and broadcast said device address in combination with said network address, to repeat the step of device address generation and transmission if a response is received, else to store said device address;

c) if a network address is generated at step a), to broadcast the generated network address, to repeat the step of network address generation and transmission if a response is received, else to store said network address then to generate and store a device address.

With this functionality, a device can either initiate a cluster (without requiring another device) or join an existing cluster. When starting a cluster, the broadcast of the generated network address (the unique cluster identifier) will be responded by devices in other local cluster (if the generated network address is already in use by another local cluster) causing the initiating device to select a new network address. With all device messages carrying both device and network address, overlapping clusters can co-exist without interference.

Preferably, the control means is arranged to store an indication that the device has been installed and, if a further command to effect the installation procedure is received, to transmit the network address in response to a received message requesting a network address. With this feature, a device can not only initiate a networked cluster but also, through the same command to initiate the installation procedure, induct a new device into the cluster. In order to provide maximum simplicity for the user, the device may have a user operable push button control, operation of which generates the command to effect the installation procedure. With this arrangement, adding a device to an existing cluster is simply a question of the user pressing one button on the device to be installed and one button on any of the devices in the cluster.

While device and/or network address generation may comprise selection from a list of possible values, it is preferred that the device comprises a random number generator coupled with the control means, with the generated device and network addresses (the latter where required) comprising respective generated random numbers.

Also in accordance with the present invention there is provided a wireless communications system comprising a cluster of devices as described above, wherein all inter-device messages contain the originating device and network addresses. With each of the devices being capable of initiating a network, joining an existing networked cluster, and handling the induction of a joining device to a networked cluster, there is no need for a specialized base station. Accordingly, this distributed arrangement is more fault tolerant in that failure of one of the devices will not automatically result in the failure of the whole system.

As a feature of this distributed system functionality, each of the devices installed in the network cluster may maintain a list of the installed device addresses of the cluster. Additionally, each installed device of a networked cluster may be configured to periodically broadcast its network and device addresses with one or more of those devices maintaining a list being configured to delete those device addresses from the list which have not been received for a predetermined period. In this way, each device is enabled to keep its address list (or so much of the address list as it holds) up to date. Optionally, each device of a cluster may be configured to periodically broadcast, with its device address, data defining the functional capabilities of that device. Within the distributed system control, this feature would enable devices to log the address of those other devices of the cluster having required functionality, such as a video cassette recorder knowing the address of televisions, satellite tuners and so forth. Preferably, at least one device of the networked cluster is configured to detect when two further devices of that cluster have a common device address and to transmit a signal to each such device the receipt of which causes each receiving device to re-execute step b) of the installation procedure, that is to say the generation of a device address and its broadcast to check whether or not it is already in use. This enables an installed cluster to automatically cure a problem arising from the rare possibility that a device in the installed cluster is unable to respond whilst another is being installed, and the device address selected by the device being installed is the same as that of the non-responding device.

While the present invention is applicable to wireless communications systems using infra-red links between devices, the preferred embodiment uses radio frequency links, the interference problems of which are counter-acted by the means provided for generating unique addresses.

BRIEF DESCRIPTION OF THE DRAWINGS

Further features and advantages of the present invention will become apparent from reading of the description of preferred embodiments of the invention, given by way of example only and with reference to the accompanying drawings, in which.

DESCRIPTION OF THE PREFERRED EMBODIMENT

Figure 1:
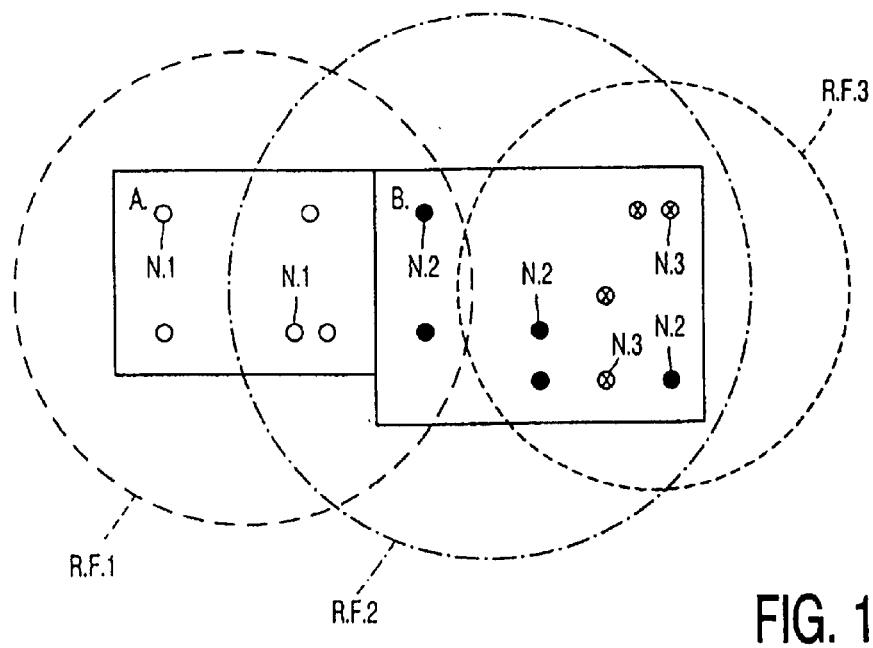
FIG. 1 represents an arrangement of devices forming three overlapping clusters.

FIG. 1 shows two adjacent rooms A,B housing a number of devices or nodes formed into three overlapping clusters. The combined RF coverage of the first cluster (clear nodes N1 in room A) is represented by line RF1, that of the second cluster (shaded nodes N2 in room B) by line RF2, and that of the third cluster (crossed nodes N3 in room B) by line RF3. As can be seen, at least some of the nodes in each cluster are within the RF range of nodes from another cluster. With all nodes supporting a common set of communications protocols and transmitting on a common frequency, there is a strong likelihood of interference or mis-control between devices of adjacent clusters unless all communications can be targeted to specific devices.

To avoid these problems of interference, a simple network-device hierarchy is imposed. All communications contain both a network address (cluster address) and node address (device address) within that network. Devices ignore communications which do not contain their network and node addresses, or their network address and a global address used for broadcast messages intended to be received by all devices of a cluster. Thus, not only do nodes belong to networks which operate independently of each other, but every product within a network can be addressed individually using its node address.

Network and node addresses are established by an installation procedure (as will be described) which procedure need only be performed when the device is first introduced. Installation is automated to minimize user involvement and eliminates the need for users to have system knowledge. The procedure prevents nodes from joining the wrong network and allows the user to expand the network from a single node.

Figure 2:
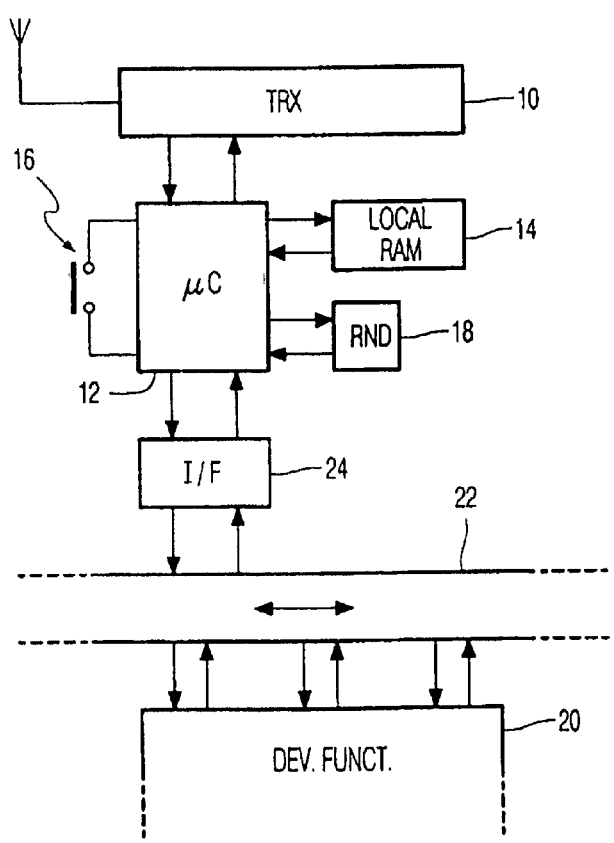
FIG. 2 is a block diagram representing functional features of a first embodiment of cluster device.

FIG. 2 shows a first embodiment of node device comprising a transceiver 10 coupled with a microcontroller 12 which in turn is coupled with a local memory 14 holding addressing and other data to be described hereinafter. The transceiver 10 provides for transmission and reception of RF messages to and from other devices of a cluster under the direction of the microcontroller 12. A single user control 16, such as a push button, is coupled with the microcontroller 14 to provide a means for initiating the installation procedure, and the microcontroller 12 is further coupled to a random number generator circuit 18 for use in address generation as will be described.

The embodiment shown has the components required for the installation procedure and RF communications relatively distinct from the functional features of the device being connected, represented by block 20, as may be the case where components 10,12,14,16 and 18 are provided to convert an existing device to function as a cluster device. As illustrated, the device functions 20, via an address and data bus 22 of the device, are coupled to the microcontroller 12 via an interface circuit 24 handling any required features such as signal level conversion.

The skilled practitioner will recognize that many variations to the arrangement of FIG. 2 are possible. Where the device functions 20 are relatively simple, for example the device is a simple detector for a security system, there may be no system bus and no need for an interface, with the device functions 20 coupled directly to the microcontroller 12. Alternatively, where the device functions 20 include available processing and storage capacity, the functions ascribed herein to the microcontroller 12 and store 14 may be handled in tandem with other processing and storage functions of the device.

Figures 3, 4:
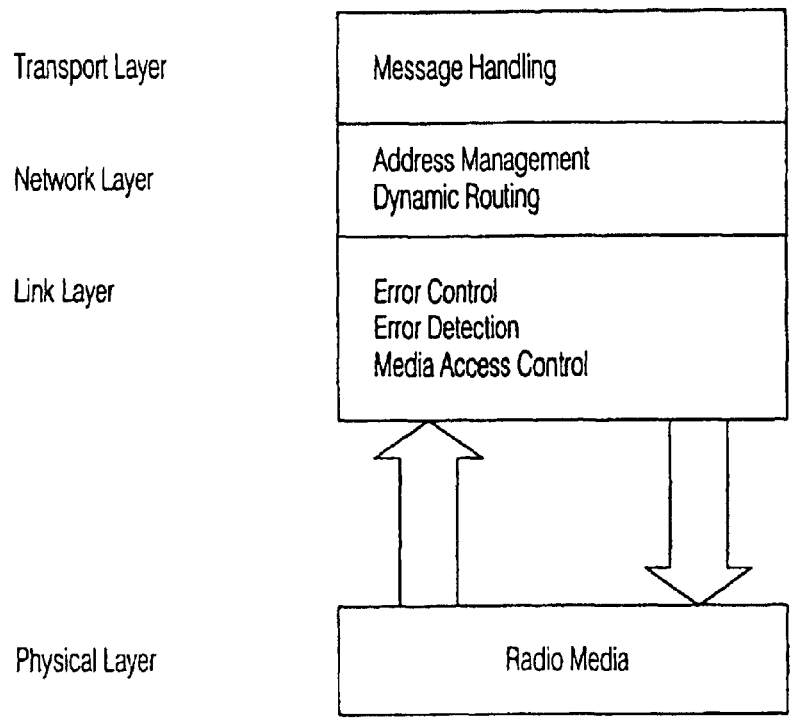
FIG. 3 schematically represents different levels in a communications protocol supported by the clusters of FIG. 1.
FIG. 4 illustrates the make up of data packets for carrying data and control signals in a system embodying the present invention.

FIG. 3 represents the various levels of the communications protocols supported by the device of FIG. 2. At the lowest level is the physical layer represented by the radio media. Above this is the link layer, comprising error control and detection for transmitted and received messages as well as media access control (MAC). The use of a common MAC protocol, specifying amongst other things signal packet duration and repeat timings, avoids physical interference between signals in the system. Above the link layer is the network layer handling address management and dynamic routing, and above that is the transport layer responsible for message handling. As will be readily understood, the establishment of node and network addresses during installation, as will be described hereinafter, falls largely within the network layer.

FIG. 4 represents the generic arrangement of message packets transmitted between devices of a cluster. Packets of all message types start with the same four fields and end with the same field. The first field is the network address NA which is an 8-bit address identifying the network to which the communicating nodes belong. The second field carries the target node address TNA which is an 8-bit address identifying the target node or device that the data packet is intended for. The third field carries a message type MT indicator which is an 8-bit field identifying the type (or purpose) and status of the packet. The message type field indicates either that the packet is an application message or that it is one of the following network messages, many of which relate to the installation procedure described below:

| | |
|---|---|
| Install Enable | EI |
| Network Address Enquire | NAE |
| Network Address Declaration | NAD |
| Distributed Network Address Acquisition | DNE |
| Distributed Node Address Acquisition | DNO |
| Node Address Exists (is known) | NAK |

-continued

| | |
|---|---|
| Enrolment (feature declaration) | ED |
| Duplicate Node Address Test | DT |
| Get New Node Address | GNA |
| Message Transfer Failed | MF |

The fourth standard field of the message packet carries the originator node address ONA which is an 8-bit address identifying the node or device originating the data packet. For each of the address fields NA, TNA and ONA, a value of 0 is used to indicate that there is no specific address (TNA=0 for broadcast messages) or the address is unknown (NA=0 when message type equals Network Address Enquire). The next field MPD is message/packet dependent. This section is of variable length and, for some of the network messages, is not required and these packets consist of just the five basic fields. Where the message is an application message, the MPD field will comprise an indication of packet number (for messages extending over a number of packets), an indication of succeeding data length and a data field. The length of the data field is constrained only by the maximum duration of a packet as specified by the MAC protocol.

The final field CRC is a 16-bit word used for cyclic redundancy checking. The checksum used for error detection of the packet is derived from the packet data from the start of the network address to the end of the data field.

Figure 5:
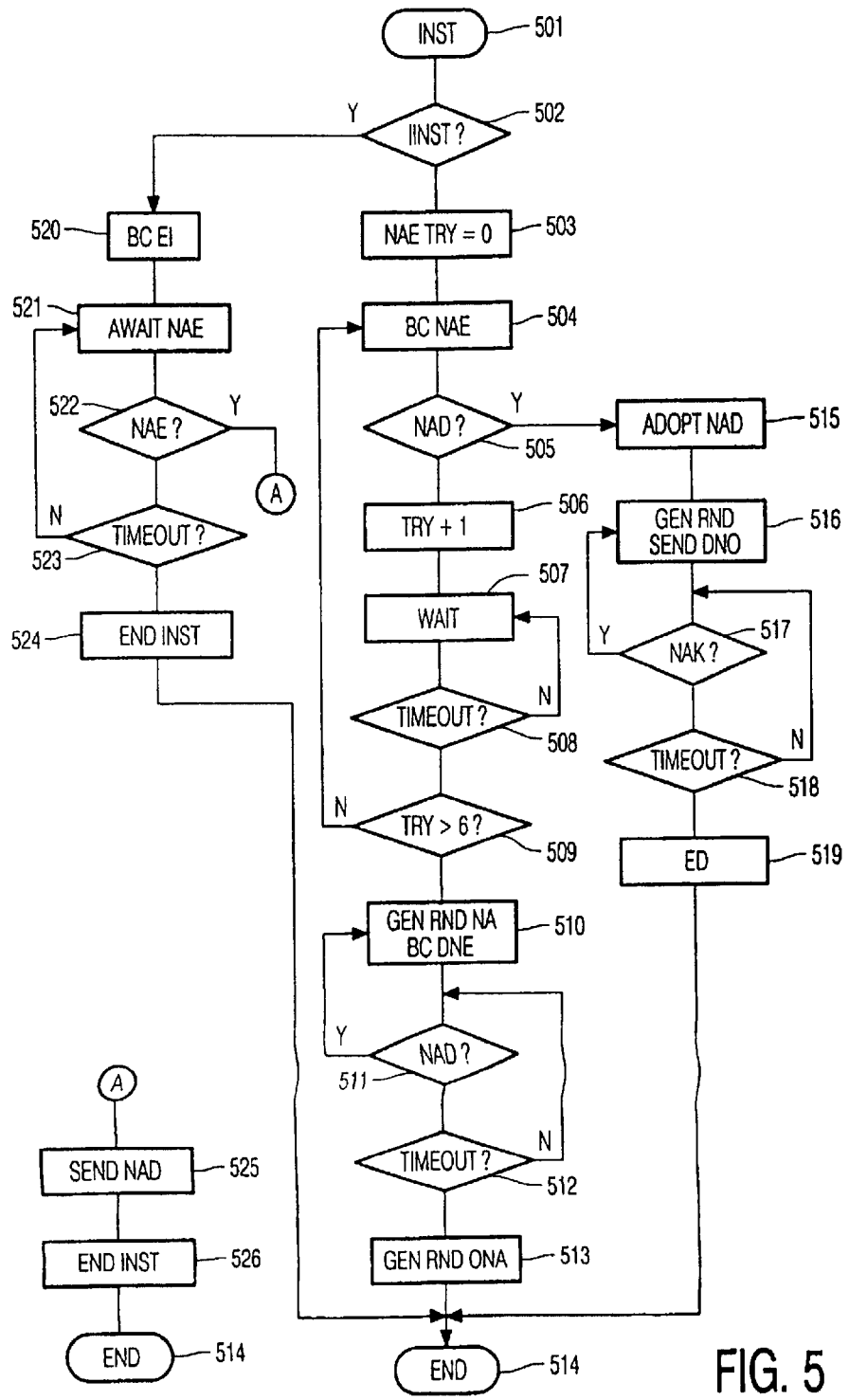
FIG. 5 is a flow chart illustrating procedures for instigating and extending a networked cluster.

Turning now to the installation routine as supported by devices in a cluster, this is illustrated in the flow chart of FIG. 5. The installation procedure INST begins at step 501 with the user activating the installation control (push button 16; FIG. 2). Next, at step 502, the device checks (IINST?) whether it is already installed. The device may maintain a specific flag to indicate this or, more simply, it checks whether it holds values of 0 for both network and node addresses (these values being the initial default settings). If step 502 determines that the device is not yet installed, the next stage, step 503, is to set a counter (TRY) to 0 following which, at step 504, the device broadcasts the network message Network Address Enquire (NAE). At step 505 the device checks for receipt of a Network Address Declaration (NAD) which indicates not only that there is another cluster within RF range but also that a device of the cluster is in install mode (devices are configured only to respond to a message NAE when in install mode). In the absence of a reply at step 505, the procedure moves to step 506 where the counter TRY is incremented by 1 following which the procedure enters a wait loop (steps 507 and 508) which pauses the procedure for, for example, 10 seconds. At the expiry of the wait period, the procedure moves to step 509 at which the device determines whether the counter TRY has a value greater than 6 (or such other value as may have been preselected). If not, the procedure reverts to step 504 where the Network Address Enquiry NAE signal is again sent.

When step 509 shows that the counter TRY has exceeded 6, which is to say the Network Address Enquiry signal NAE has been sent seven times without receiving a Network Address Declaration NAD signal in response, the device assumes that there are no clusters with devices in install mode within RF range and hence it is the first device of a new cluster. Accordingly, at step 510, the device generates a random network address and broadcasts this as part of the Distributed Network Address Acquisition signal (DNE). All devices are configured to respond to a receipt of a DNE signal carrying their network address with a Network Address Declaration and, consequently, step 511 checks for receipt of an NAD signal in response to the device sending of the DNE signal. If a reply is received, the procedure reverts to step 510 where a new random network address is generated and a further DNE signal sent. Via a timer check at step 512 the device waits for a short time (such as 5 seconds) for a Network Address Declaration (NAD) and, in the absence of a reply, moves to step 513 at which a random node address for the device is generated and stored. For the single device starting a cluster, this is the final step and the procedure ends (step 514).

Reverting to step 505, if a response in the form of a Network Address Declaration NAD is received to the broadcast of the Network Address Enquire NAE signal the device can assume that it is joining an existing cluster and the procedure diverts to step 515 at which the device stores as its own network address that address specified in the received Network Address Declare (NAD) signal. Having determined to which cluster it belongs, the device next establishes a unique address within the cluster: at step 516 the device generates a random node address and broadcasts this (with the adopted network address) as part of a distributed node address acquisition signal (DNO) at step 517 (with a wait loop provided by step 518) following which the device watches for receipt of a node address known (NAK) signal. If such a signal is received, the device knows that the particular node or device address is already in use by a device within the cluster and the procedure reverts to step 516 where a further random node address is generated and a further DNO signal transmitted. When the time out loop provided by step 518 following which expires without a network address known (NAK) signal having been received, the device assumes the node address to be unique within the cluster and adopts it. The procedure then moves to step 519 with the device performing an enrolment procedure. This involves the sending of an enrolment, feature declaration (ED) message which contains data according to a predetermined format specifying the functional features of the device, such as whether it has a display, whether it has data storage means and so forth. As will be described hereinafter, other devices of the cluster receiving the ED message can add the capabilities of the newly installed device to their internal records of the overall system functionality. Having completed enrolment at step 519, the procedure again ends (step 514).

When installed, the device can also act to induct a new device into a cluster with this procedure again being initiated by pressing the installation button (step 501). This time, the test of whether the device is already installed (IINST?) at step 502 will show positive and the procedure moves to step 520 at which the device broadcasts an install enable (EI) network message to place the other devices already in the cluster into install mode, as they may be required to send a node address known (NAK) signal in response to a distributed node address acquisition signal (DNO) in the near future. It should be noted that any of the devices of a networked cluster can generate a NAK signal, by comparison of the address in the DNO signal with an internally held table of node addresses (to be described).

Following broadcast of the EI signal at step 520, the device moves into a waiting loop (steps 521, 522 and 523) awaiting the arrival of a network address enquire (NAE) signal from the joining device if a time out value of, for example, one minute is reached without receipt of an NAE signal, the device exits the installation mode (step 524) and the procedure ends (step 514). However, if it is determined that an NAE signal has been received (step 522) the device will implement step 525, namely the sending of a network address declaration (NAD) before exiting the installation mode (step 526) and ending the procedure (step 514). Having entered the wait loop for receipt of the NAE signal (step 521), the device may monitor transmissions such that having received an NAE signal (step 522) it will disable the sending of a network address declaration (NAD) at step 525 if it determines that such a signal has already been sent by one of the other devices of the cluster.

Figures 6, 7:
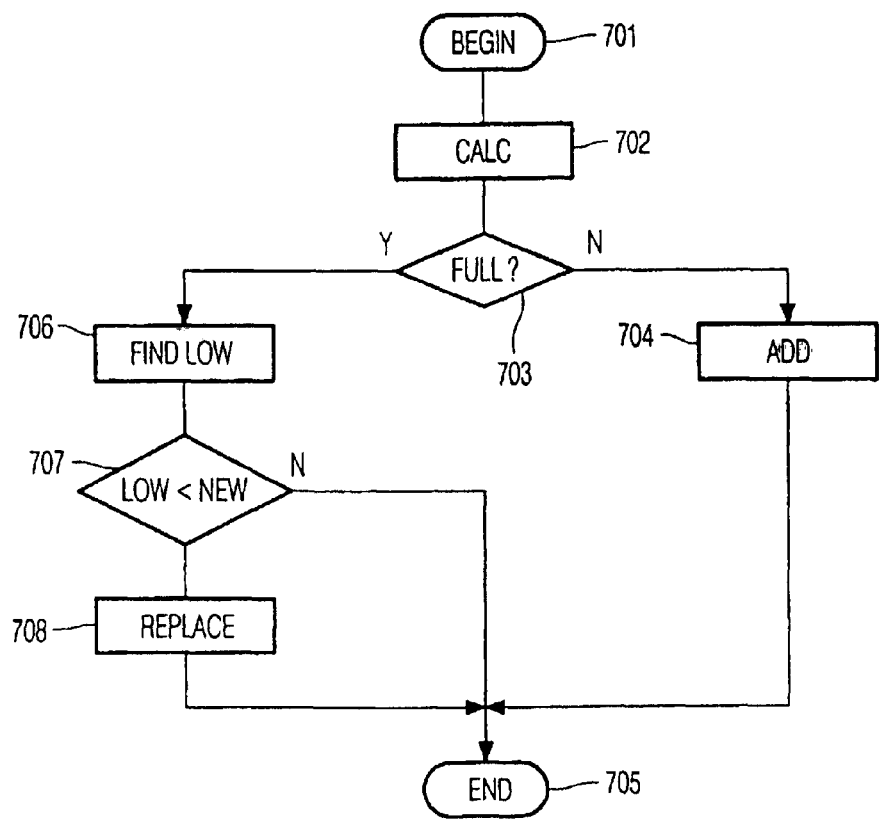
FIG. 6 is an example of a node table as held by one or more devices of a cluster.
FIG. 7 is a flow chart illustrating the procedure for maintaining a node table as in FIG. 6.

As mentioned above with regard to step 519, newly inducted devices perform an enrolment routine. Enrolment is preferably repeated periodically so that devices of a cluster have up to date information on which devices exist and what features they have. This information is stored in a locally held node table, an example of which is shown in FIG. 6. A device will clear another device's entry from their node table after a predetermined period (for example, 15 minutes) if that device has not re-enrolled. This feature is particularly useful for automatically detecting the loss or removal of a node.

The node table holds the device address (node address) of at least some of the other devices, together with a list of feature flags for each of those devices and a feature score. The feature flags indicate generic features of the devices: a classification for system features may be:

1. Display (for example LCD, television, monitor)
2. Entry (for example, keyboard, remote control handset)
3. Sensor (for example, passive infra-red, thermostat)
4. Actuator (for example, light switch, door lock)
5. Storage (for example, computer hard drive or CD ROM)
6. Communications (for example, telephone or infra-red)

The feature score is specific to the device holding the table and is calculated by summing the number of features each device possesses that are of interest to the device holding the table. In the example of FIG. 6, the holder requires a device having features 1, 2 and 5 (display, entry and storage) and identifies the device with node address 1 as the most likely to fulfil these requirements.

The node table maintains information on all devices in the networked cluster (or at least those that are in communication with the device holding the table) or a sub-set selected using feature scores to discard those least likely to be useful once the network has expanded to the point where the node table would otherwise exceed the available storage space. FIG. 7 represents the procedure applied which acts as a pre-filter for the application, maintaining knowledge of those devices with which the application is likely to communicate in preference to those nodes classified, by virtue of their feature scores, as less likely to be of use. It will be recognized that the broad grouping of the generic node features may result in some devices having a feature score which exceeds their actual usefulness to the device holding the table and consequently a mechanism is provided whereby devices specifically identified as relevant (for example those devices with which the device in question has recently communicated) can be "locked" to prevent them from being removed from the node table when a device with a higher feature score is added to the cluster.

The maintenance procedure begins at step 701, suitably triggered by the detected installation of a new device to the cluster. On receipt of the ED message from the new device, the feature flags for that device are noted and a new feature score calculated (step 702). At step 703, a check is made to see whether the device node table is full. If not, at step 704 the node address, feature flags and feature score for the new node are added to the table and the procedure ends (step 705). However, if at step 703 it is determined that the device already has a full node table, the existing device listed in the table having the lowest feature score (and not being a locked device) is identified. At step 707, the feature score of the selected existing table entry is compared with that of the new device, if the new device has a lower feature score than that of the identified device from the table, the details of the new device are discarded and the procedure ends (step 705). If, on the other hand, the new device has a higher feature score than the lowest existing in the table, then at step 708 the node address feature flags and feature score for the new device are added to the table in place of those of the previously identified table entry. Following replacement, the procedure again ends (step 705). It should be noted that, in order to avoid multiple entries due to the periodic re-enrolment requirement, each device is configured to maintain in its table only one entry from each node address.

Although very unlikely, one or more devices may obtain the same device (node) address due to a device being temporarily out of service during an installation procedure or the cluster being physically very extended with some of the devices of that cluster beyond the RF range of a joining device. A mechanism is provided for detecting duplicate node addresses and causing the devices in question to select new unique addresses.

Figure 8:
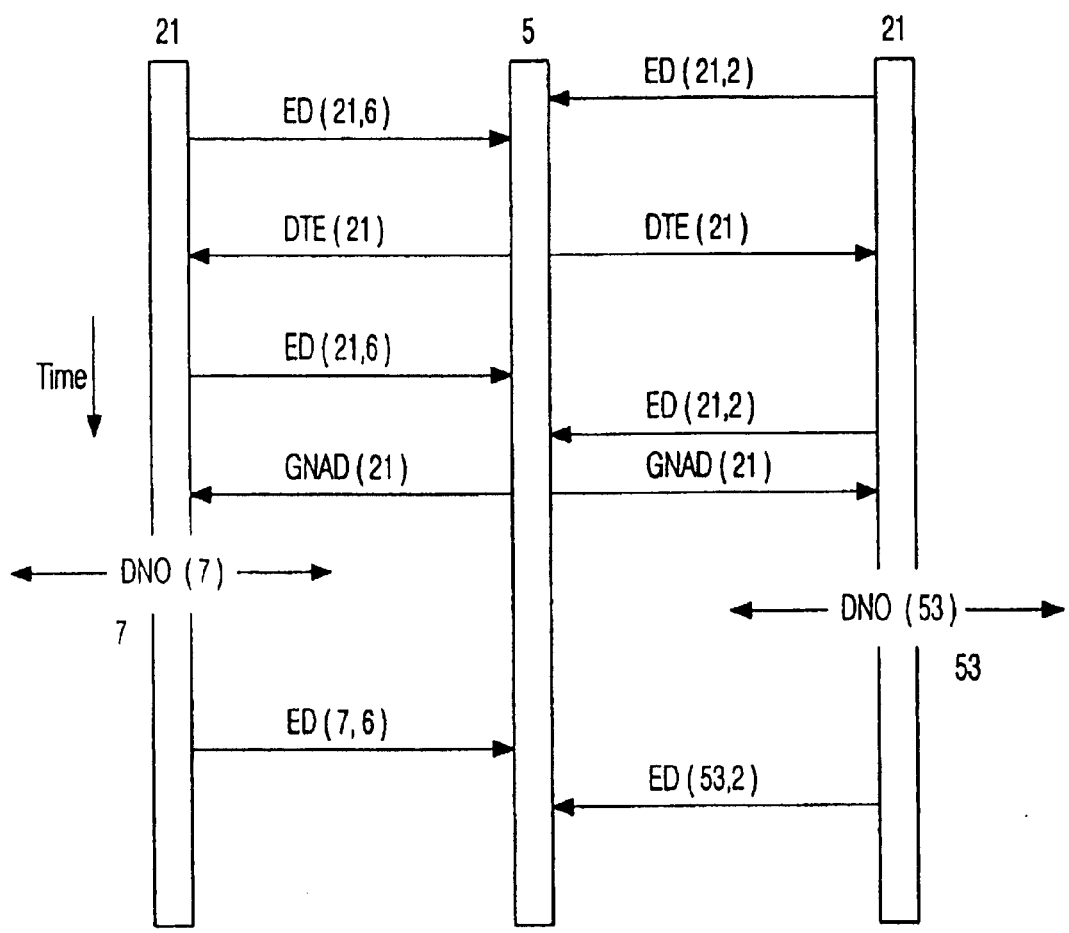
FIG. 8 schematically represents a procedure for resolving device address duplication in a networked cluster.

The detection of duplicate addresses will generally arise due to the requirement for periodic re-enrolment of devices to maintain their place in the node tables of devices of the network. A re-enrolment message received from a device in which message the feature declaration has changed is taken as an indication of possible duplication. FIG. 8 represents an example communications session in which two nodes with address 21 send enrolment messages ED (one listing feature flag 2, the other feature flag 6) to node 5. Having noted the apparent feature change, from feature 2 to feature 6, device 5 sends out a duplicate test message (DTE) to the suspect node address. The DTE message does not require any formal acknowledgement message but will cause any nodes with the suspect node address to respond with another enrolment message (ED). Due to the MAC protocol, all messages should reach the node 5 and consequently, if there are multiple replies, it is taken that there are multiple nodes with the same node address. Having established that there are multiple nodes with the same node address, the detecting node (node 5) sends a get-new-address (GNAD) to the nodes with the duplicated address. On receipt of the GNAD message, the duplicate nodes perform the distributed node address acquisition procedure (message DNO) to obtain for themselves a new address, device address 7 and 53 being selected in the example shown in FIG. 8. For reasons of efficiency, it is desirable that all other devices receiving the GNAD message should remove any entry for the duplicate address from their node tables: however, any devices which (for whatever reason) do not receive the GNAD signal, will eventually clear the duplicate node address device entries because of a failure to periodically re-enrol.

Other considerations of a wireless communications system, not described above and not bearing on the operation of the present invention will be apparent to the skilled reader. For example, to reduce power consumption (particularly where the cluster device is portable and battery powered) the transceivers may be generally powered down but woken periodically to check for messages. To avoid problems of signal reflection leading to multi-path errors in RF signals and transmission failure in infra-red signals, a system of dynamic message routing may be provided for whereby a device failing to obtain acknowledgement of a directly targeted message packet may instead send that packet to a further device with instructions to pass it on to the original target. Further features of this dynamic routing technique are described in our United Kingdom patent application no. 9715857.0 filed 29th Jul. 1997 and entitled "Wireless Network Message Routing".

In the foregoing, we have described a wireless communication system requiring as little as one button push to initiate a cluster, with automated avoidance of mis-control and interference from other networks within operating range. The system arrangement has a wide range of applications, including remote control of consumer electronics products, as a control channel for managing cordless audio/visual signal transfer, home automation (in like manner to the home bus systems mentioned in the introduction), game controllers, security detectors, cordless keyboards, data links (such as between a personal computer and handheld device), telemetry (such as for remote meter reading), and even establishing unique hand-set addresses in cordless telephone systems. The device features to enable an apparatus to operate according to the present invention will, in many cases, require only the addition of a transceiver device, and the resulting system does not require a specialised base station thereby minimizing start-up costs and reducing the system's vulnerability to device failure.

From reading the present disclosure, other modifications and variations will be apparent to persons skilled in the art, including equivalents and features which are already known in the field of cordless communication systems and components and which may be used instead of or in addition to features already disclosed herein. Although claims have been formulated in this Application to particular combinations of features, it should be understood that the scope of the disclosure of the present application includes any and every novel feature or any novel combination of features disclosed herein either explicitly or implicitly and any generalization thereof, whether or not it relates to the same invention as presently claimed in any Claim and whether or not it mitigates any or all of the same technical problems as does the present invention.

What is claimed is:

1. A device for use as a station in a wireless communications system comprised of a cluster of such devices operating according to a predetermined communications protocol, the device comprising control means coupled with an address data store and a transceiver, the control means being operable to transmit and receive data and control messages via said transceiver and to effect an installation procedure whereby each device of a cluster obtains a different device address;

wherein the control means is arranged, on receipt of a command to effect an installation procedure:

a) to generate and broadcast a first message requesting a network address, to store a network address if received in reply, else to generate a network address;

b) if a network address is received at step a) to generate a device address and broadcast said device address in combination with said network address, to repeat the step of device address generation and transmission if a response is received, else to store said device address;

c) if a network address is generated at step a), to broadcast the generated network address, to repeat the step of network address generation and transmission if a response is received, else to store said network address then to generate and store a device address.

2. A device as claimed in claim 1, wherein the control means is arranged to store an indication that the device has been installed and, if a further command to effect the installation procedure is received, to transmit the network address in response to a received message requesting a network address.

3. A device as claimed in claim 1, comprising a random number generator coupled with the control means, wherein the generated device address comprises a generated random number.

4. A device as claimed in claim 3, wherein the network address, if generated, comprises a generated random number.

5. A device as claimed in claim 1, said device having a user operable push button control, operation of which generates said command to effect the installation procedure.

6. A wireless communications system comprising a cluster of devices according to claim 2, installed as a network, wherein all inter-device messages contain the originating device and network addresses.

7. A system as claimed in claim 6, wherein each of the devices installed in a networked cluster maintains an at least partial list of the installed device addresses of the cluster.

8. A system as claimed in claim 7, wherein each installed device of a networked cluster is configured to periodically broadcast its network and device addresses and those devices of the networked cluster maintaining an at least partial list are configured to delete those device addresses from the list for which a broadcast device address has not been received for a predetermined period.

9. A system as claimed in claim 8, wherein each device of a networked cluster is configured to periodically broadcast, with its device address, data defining functional capabilities of that device.

10. A system as claimed in claim 6, wherein at least one device of the networked cluster is configured to detect when two further devices of that cluster have a common device address and to transmit a signal to each such device, the receipt of which causes each receiving device to re-execute step b) of the installation procedure.

11. A system as claimed in claim 6, wherein the wireless communication between devices of a networked cluster is by radio frequency link.

* * * * *